(12) United States Patent
Chen et al.

(10) Patent No.: US 9,350,640 B2
(45) Date of Patent: May 24, 2016

(54) CONSTRUCTING A TOPOLOGY-TRANSPARENT ZONE

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 129 days.

(21) Appl. No.: 14/188,080

(22) Filed: Feb. 24, 2014

(65) Prior Publication Data

US 2014/0241372 A1 Aug. 28, 2014

Related U.S. Application Data

(60) Provisional application No. 61/768,983, filed on Feb. 25, 2013.

(51) Int. Cl.
*H04L 12/751* (2013.01)
(52) U.S. Cl.
CPC ..................... *H04L 45/02* (2013.01)
(58) Field of Classification Search
None
See application file for complete search history.

(56) References Cited

U.S. PATENT DOCUMENTS

| | | | | |
|---|---|---|---|---|
| 2005/0047327 A1* | 3/2005 | Saleh | | H04L 45/02 370/221 |
| 2006/0056328 A1* | 3/2006 | Lehane | | H04L 45/02 370/315 |
| 2009/0168666 A1* | 7/2009 | Unbehagen | | H04L 12/4662 370/254 |
| 2012/0243443 A1 | 9/2012 | Li et al. | | |
| 2013/0003730 A1* | 1/2013 | Tajima | | H04L 45/12 370/389 |

FOREIGN PATENT DOCUMENTS

| CN | 102868619 A | 1/2013 |
|---|---|---|
| CN | 102932260 A | 2/2013 |

OTHER PUBLICATIONS

Partial English Translation and Abstract of Chinese Patent Application No. CN102868619A, Jul. 24, 2014, 6 pages.
Partial English Translation and Abstract of Chinese Patent Application No. CN102932260A, Jul. 24, 2014, 5 pages.
Foreign Communication From a Counterpart Application, PCT Application No. PCT/CN2014/072503, International Search Report dated May 6, 2014, 7 pages.

(Continued)

*Primary Examiner* — Ian N Moore
*Assistant Examiner* — Latresa McCallum
(74) *Attorney, Agent, or Firm* — Conley Rose, P.C.; Grant Rodolph; Adam J. Stegge (57) ABSTRACT

A network node used to construct a topology-transparent zone (TTZ). The network node may obtain a TTZ identifier (ID) that is uniquely associated with a TTZ. Additionally, the network node may obtain a first link that couples the network node to a second network node that is also assigned the TTZ ID and a second link that couples the network node to a third network node that is not assigned the TTZ ID. The network node may generate a router information (RI) link-state advertisement (LSA) that indicates whether the network node is a TTZ edge node or a TTZ internal node and that indicates the TTZ associated with the TTZ. The network node may distribute the RI LSA to the second network node that is also assigned the TTZ ID using the first link.

11 Claims, 6 Drawing Sheets

(56) References Cited

OTHER PUBLICATIONS

Foreign Communication From a Counterpart Application, PCT Application No. PCT/CN2014/072503, Written Opinion dated May 6, 2014, 5 pages.
Oran, D., "OSI IS-IS Intra-domain Routing Protocol," RFC 1142, Feb. 1990, 157 pages.
Chen, H., et al., "OSPF Topology-Transparent Zone", draft-chen-ospf-ttz-00.txt, Oct. 24, 2011, 40 pages.
Chen, H., et al., "OSPF Topology-Transparent Zone", draft-chen-ospf-ttz-01.txt, Mar. 12, 2012, 44 pages.
Chen, H., et al., "OSPF Topology-Transparent Zone", draft-chen-ospf-ttz-02.txt, Jul. 16, 2012, 40 pages.
Chen, H., et al., "OSPF Topology-Transparent Zone", draft-chen-ospf-ttz-03.txt, Oct. 20, 2012, 40 pages.
Chen, H., et al., "OSPF Topology-Transparent Zone", draft-chen-ospf-ttz-04.txt, Feb. 25, 2013, 32 pages.
Chen, H., et al., "OSPF Topology-Transparent Zone", draft-chen-ospf-ttz-05.txt, May 4, 2013, 32 pages.
Chen, H., et al., "OSPF Topology-Transparent Zone", draft-chen-ospf-ttz-06.txt, Jul. 15, 2013, 32 pages.
Chen, H., et al., "OSPF Topology-Transparent Zone", draft-chen-ospf-ttz-07.txt, Jan. 16, 2014, 15 pages.
Bradner, S., "Key words for use in RFCs to Indicate Requirement Levels", RFC 2119, Mar. 1997, 6 pages.
Moy, J., "OSPF Version 2", RFC 2328, Apr. 1998, 244 pages.
Coltun, R., "The OSPF Opaque LSA Option", RFC 2370, Jul. 1998, 15 pages.
Coltun, R., et al., "OSPF for IPv6", RFC 2740, Dec. 1999, 160 pages.
Katz, D., et al., "Traffic Engineering (TE) Extensions to OSPF Version 2", RFC 3630, Sep. 2003, 14 pages.
Lindem, A., et al., "Extensions to OSPF for Advertising Optional Router Capabilities", RFC 4970, Jul. 2007, 26 pages.
Coltun, R., et al., "OSPF for IPv6", RFC 5340, Jul. 2008, 94 pages.
Vasseur, JP., et al., "Path Computation Element (PCE) Communication Protocol (PCEP)", RFC 5440, Mar. 2009, 174 pages.
Vasseur, JP., et al., "A Backward-Recursive PCE-Based Computation (BRPC) Procedure to Compute Shortest Constrained Inter-Domain Traffic Engineering Label Switched Paths", RFC 5441, Apr. 2009, 36 pages.
Aggarwal, R., et al., "Advertising a Router's Local Addresses in OSPF Traffic Engineering (TE) Extensions", RFC 5786, Mar. 2010, 7 pages.

* cited by examiner

CONSTRUCTING A TOPOLOGY-TRANSPARENT ZONE

CROSS-REFERENCE TO RELATED APPLICATIONS

The present application claims priority to U.S. Provisional Application No. 61/768,983 filed Feb. 25, 2013 by Huaimo Chen et al., and entitled "System and Methods for Constructing TTZ," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As Internet traffic continues to grow, the number of network nodes may also increase within a network. To manage the Internet traffic, the network may be extended by splitting the network into a plurality of areas. However, splitting the network may be challenging or may cause scalability issues, convergence issues, and/or performance issues. For instance, dividing a network from one area into multiple areas or from a number of existing areas to more areas may be time consuming and also involve significant network architecture changes. Services carried by a network may also be interrupted while the network is being split into multiple areas. Further, setting up a multi-protocol label switching (MPLS) traffic engineering (TE) label switching path (LSP) that crosses multiple areas may be complex. In a conventional system, a TE path crossing multiple areas may be computed by using a path computation element (PCE) through the PCE Communication Protocol (PCEP). Such a conventional system may require manual configuration of the sequenced domains and may be difficult to configure by a network operator. Additionally, the conventional system may not guarantee an optimal path and may also require a large number of link states such as link-state advertisements (LSAs) that are distributed amongst the network nodes.

SUMMARY

In one example embodiment, the disclosure includes a network node used to construct a topology-transparent zone (TTZ). The network node may obtain a TTZ identifier (ID) that is uniquely associated with a TTZ. Additionally, the network node may obtain a first link that couples the network node to a second network node that is also assigned the TZZ ID and a second link that couples the network node to a third network node that is not assigned the TTZ ID. The network node may generate a router information (RI) LSA that indicates whether the network node is a TTZ edge node or a TTZ internal node and provides the TTZ ID associated with the TZZ. The network node may distribute the RI LSA to the second network node that is also assigned the TZZ ID using the first link.

In another example embodiment, the disclosure includes a network node used to construct a TTZ. The network node may obtain a TTZ ID that is uniquely associated with a TTZ. The network node may establish a plurality of links to other network nodes that are assigned the TTZ ID. The network node may generate a RI LSA comprising the TTZ ID and may flood the RI LSA to the other network nodes assigned the TTZ ID using the plurality of links.

In yet another example embodiment, the disclosure includes a network node used to construct a TTZ. The network node may obtain a TTZ ID uniquely associated with a TTZ. Additionally, the network node may obtain a plurality of virtual links and a link to a second network node that is not assigned the TTZ ID. The network node may generate an LSA for virtualizing the TTZ using the plurality of virtual links and the link. Upon generating the LSA for virtualization, the network node may distribute the LSA for virtualization using the plurality of virtual links and the link.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments for constructing a TTZ. A plurality of network nodes may be used to construct a TTZ that increases the scalability of a network and minimizes service interruptions when splitting or converging a network. A TTZ may comprise a plurality of network nodes and a plurality of links between the network nodes and may be virtualized such that network nodes located outside of the TTZ are unaware of the network nodes, links, and connections within the TTZ. The implementation of one or more TTZs may be effective in reducing link state distributions within a network and may be less complex for computing a path for an MPLS TE LSP crossing multiple areas or autonomous systems (AS). For example, LSPs may be computed without relying on intermediaries (e.g., a PCE). As such, the TTZ may be configured to provide end to end service crossing the TTZ such that network nodes outside of the TTZ may interact with the TTZ, but are unaware of the topology or the construction of the TTZ. By implementing TTZ within a network, TTZ may provide for improved network performance, increased scalability, faster re-convergence, better performance, and reduced processing consumption, while maintaining compatibility in calculating paths (e.g., paths for LSPs) for network nodes located outside of the TTZ.

Figure 1:
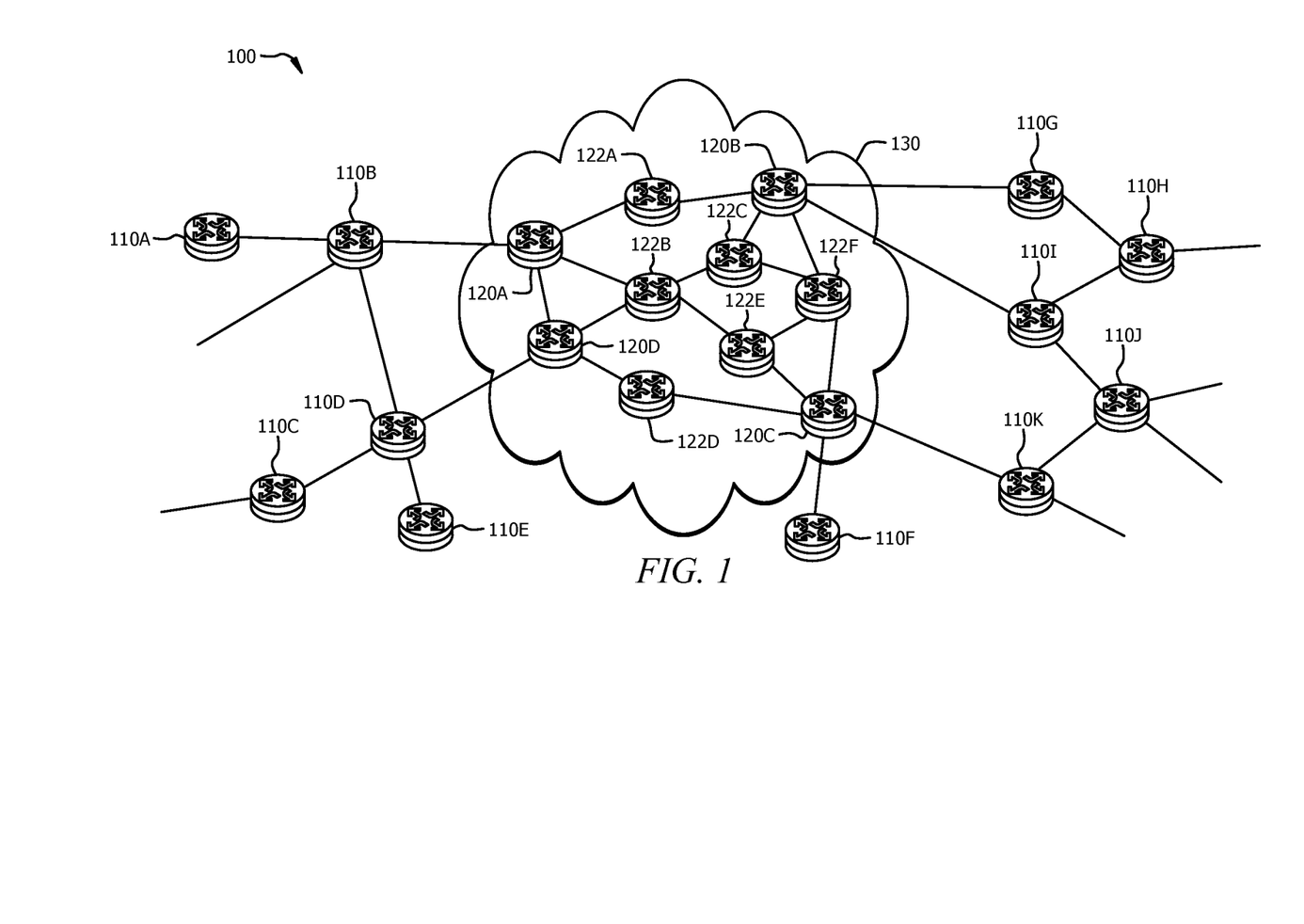
FIG. 1 is a schematic diagram of an example embodiment of a label switched system.

FIG. 1 is a schematic diagram of an example embodiment of a label switched system 100. The label switched system 100 comprises a plurality of network nodes 110A-110K and a TTZ 130 which comprises a plurality of TTZ edge nodes 120A-120D and a plurality of TTZ internal nodes 122A-122F. In one example embodiment, a TTZ 130 may be a zone within an open shortest path first (OSPF) network or area in the label switched system 100. A network operator or centralized controller (e.g., a software-defined network (SDN) controller) may set up the TTZ edge nodes 120A-120D and/or the TTZ internal nodes 122A-122F. A TTZ edge node 120A-120D may be coupled to one or more network nodes 110A-110K located outside TTZ 130, one or more TTZ internal nodes 122A-122F, and/or one or more other TTZ edge nodes 120A-120D. A TTZ internal node 122A-122F may be coupled to one or more other TTZ internal nodes 122A-122F, and/or one or more TTZ edge nodes 120A-120D. A TTZ internal node 122A-122F may not be directly coupled to a network node outside of the TTZ 130, for example, network nodes 110A-110K. The TTZ edge node 120A-120D and the TTZ internal node 122A-122F may be configured to use a common TTZ ID, which may be a label that identifies TTZ 130.

The network nodes 110A-110K, the TTZ edge node 120A-120D, and the TTZ internal nodes 122A-122F may be coupled to one another via one or more links. The links discussed herein may be physical links, such as electrical and/or optical links, and/or logical links (e.g., virtual links) used to transport data. A link between two network nodes within the TTZ 130 (e.g., the TTZ edge nodes 120A-120D and/or the TTZ internal node 122A-122F) may be referred to as a TTZ link. As such, a link between a network node within the TTZ 130 (e.g., the TTZ edge nodes 120A-120D) and a network node outside of the TTZ 130 (e.g., network nodes 110A-110K) may be referred to as a non-TTZ link.

In one example embodiment, the TTZ edge nodes 120A-120D may be set up by configuring a TTZ ID on each of the TTZ edge nodes 120A-120D and on each of the links between each of the TTZ edge nodes 120A-120D and other TTZ edge nodes 120A-120D and/or TTZ internal nodes 122A-122F. The TTZ internal nodes 122A-122F may be set up by configuring the TTZ ID on each of the TTZ internal nodes 122A-122F. Configuring the TTZ ID on each of the TTZ internal nodes 122A-122F may indicate that the TTZ internal nodes 122A-122F are TTZ internal nodes and the links associated with each of the TTZ internal nodes 122A-122F are TTZ links.

The network nodes 110A-110K, the TTZ edge nodes 120A-120D, and the TTZ internal nodes 122A-122F may be any devices or components that support the transportation of data traffic (e.g., data packets) through the label switched system 100. For example, the network nodes 110A-110K, the TTZ edge nodes 120A-120D, and the TTZ internal nodes 122A-122F may be switches, routers, any other suitable network device for communicating packets as would be appreciated by one of ordinary skill in the art upon viewing this disclosure, or combinations thereof. The network nodes 110A-110K, the TTZ edge nodes 120A-120D, and the TTZ internal nodes 122A-122F may be configured to receive data from other network nodes, to determine which network nodes to send the data to (e.g., via logic circuitry or a forwarding table), and/or to transmit the data to other network nodes.

In an example embodiment, the TTZ edge nodes 120A-120D and the TTZ internal nodes 122A-122F may be configured to generate an RI LSA comprising a TTZ type-length-value (TLV). For example, a TTZ edge node (e.g., TTZ edge node 120A) may generate an RI LSA comprising a TTZ TLV indicating the TTZ edge node is a TTZ edge node and a TTZ ID for the TTZ 130. The TTZ ID may be a numeric value, such as 100, that identifies TTZ 130. A TTZ internal node (e.g., TTZ internal node 122A) may generate an RI LSA comprising a TTZ TLV that indicates the TTZ internal node is a TTZ internal node and a TTZ ID (e.g., 100) for TTZ 130. The TTZ edge nodes 120A-120D and the TTZ internal nodes 122A-122F may be configured to flood the RI LSA to other TTZ edge nodes (e.g., TTZ edge nodes 120A-120D) and/or to other TTZ internal nodes (e.g., TTZ internal nodes 122A-122F). For example, the TTZ edge nodes 120A-120D and the TTZ internal nodes 122A-122F may send the RI LSAs via the TTZ links. The TTZ edge node 120A-120D may not send the RI LSAs via non-TTZ links.

The TTZ edge nodes 120A-120D and the TTZ internal nodes 122A-122F may also be configured to receive a plurality of RI LSAs comprising a TTZ TLV from other TTZ edge nodes 120A-120D and/or other TTZ internal nodes 122A-122F. After receiving the RI LSAs, the TTZ edge nodes 120A-120D and the TTZ internal nodes 122A-122F may be configured to store information pertaining to the RI LSAs. For example, after receiving an RI LSA comprising a TTZ TLV with a TTZ ID, the RI LSA information may be stored into a link-state database (LSDB). The RI LSA information stored within the LSDB may include, but are not limited to, the advertising node, the node type (e.g., TTZ edge node or TTZ internal node), and the TTZ ID. Once receiving and/or storing the RI LSA information, the TTZ edge nodes 120A-120D and the TTZ internal nodes 122A-122F may flood the RI LSA to other TTZ edge nodes 120A-120D and/or other TTZ internal nodes 122A-122F over the TTZ links.

The topology of a TTZ such as TTZ 130 may be determined by receiving and storing RI LSAs and conventional LSAs. For example, the topology of the TTZ may be represented by all the conventional LSAs stored in the TTZ edge nodes 120A-120D and/or the TTZ internal nodes 122A-122F. In such an example, each of the conventional LSAs may comprise the same advertising network node as one of the RI LSAs stored in the TTZ edge nodes 120A-120D and/or the TTZ internal nodes 122A-122F.

The TTZ edge nodes 120A-120D may also be configured to compute routes using the topology of the TTZ 130. The topology of the TTZ 130 may comprise the TTZ edge nodes 120A-120D and the TTZ internal nodes 122A-122F having the TTZ ID associated with the TTZ 130. For example, a TTZ edge node may be configured to compute the shortest path to other TTZ edge nodes using the topology of the TTZ 130 and the RI LSAs with the TTZ ID for the TTZ 130. The cost of the shortest path may be used as the cost of a virtual link between two TTZ edge nodes.

The TTZ edge nodes 120A-120D may also be configured to generate an LSA for virtualizing the TTZ 130 comprising a plurality of virtual links and a plurality of non-TTZ links. The TTZ edge nodes 120A-120D may be configured to distribute the LSA for virtualizing the TTZ 130 via the TTZ links and the non-TTZ links. In response to receiving an LSA for virtualizing the TTZ 130, the TTZ edge nodes 120A-120D and the TTZ internal nodes 122A-122F may be configured to store the LSA for virtualizing the TTZ 130, such as within a LSDB. In an example embodiment, the LSA for virtualizing the TTZ 130 may be stored in a different LSDB than the RI LSAs. Additionally, the TTZ edge nodes 120A-120D and the TTZ internal nodes 122A-122F may be configured to flood the LSA for virtualizing the TTZ 130 to network nodes 110A-110K, other TTZ edge nodes 120A-120D, and/or other TTZ internal nodes 122A-122F using the TTZ links and the non-TTZ links.

Figure 2:
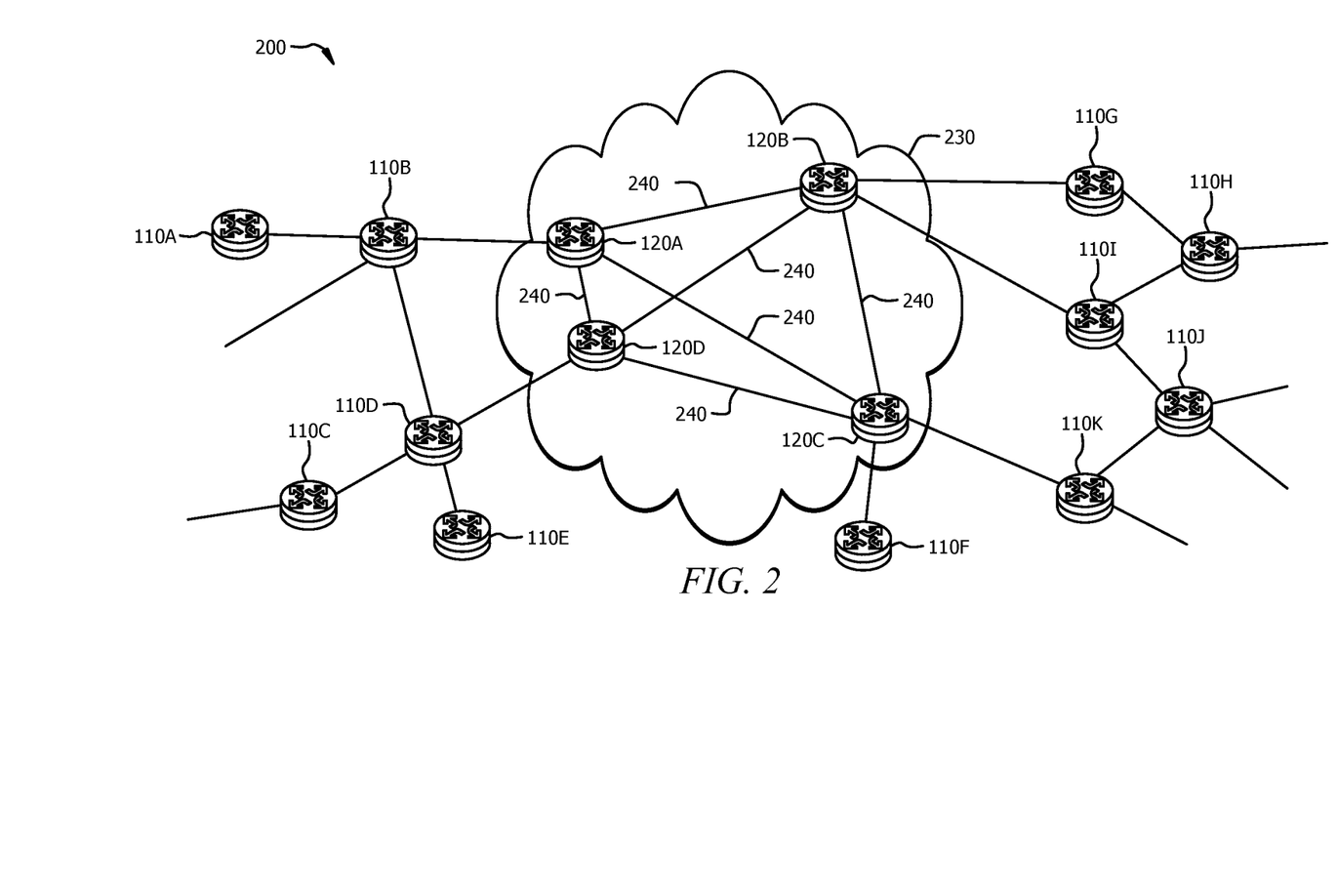
FIG. 2 is schematic diagram of another example embodiment of a label switched system.

FIG. 2 is a schematic diagram of another example embodiment of a label switched system 200. The label switched system 200 comprises the plurality of nodes 110A-110K and a virtualized TTZ 230. A virtualized TTZ 230 may be configured such that TTZ links and TTZ internal nodes (e.g., TTZ internal nodes 122A-122F in FIG. 1) inside of the virtualized TTZ 230 are unknown to network nodes outside of the virtualized TTZ 230. In an example embodiment, the virtualized TTZ 230 may be configured to appear as a group of fully connected TTZ edge nodes 120A-120D that connect to network nodes outside of the virtualized TTZ 230. A link between the TTZ edge nodes (e.g., a link between TTZ edge node 120A and TTZ edge node 120B) in a virtualized TTZ 230 may be a virtual link 240. A virtual link 240 may correspond to one of the paths between two TTZ edge nodes 120A-120D within TTZ 130 as described in FIG. 1. Using FIG. 1 as an example, the virtual link 240 between TTZ edge nodes 120A and 120B may correspond to the path that includes TTZ edge node 120A, TTZ internal node 122A, and TTZ edge node 120B in FIG. 1. In one example embodiment, a virtual link may be the shortest path or lowest cost link between a pair of TTZ edge nodes 120A-120D when multiple paths interconnect the pair of TTZ edge nodes. A network node outside of the virtualized TTZ 230 may not be aware of TTZ links within the virtualized TTZ 230, but may be aware of virtual links 240 within the virtualized TTZ 230. For example, a network node 110B may be aware of a virtual link 240 between TTZ edge node 120A and TTZ edge node 120B, a virtual link 240 between TTZ edge node 120A and TTZ edge node 120C, and a virtual link 240 between TTZ edge node 120A and TTZ edge node 120D. However, network node 110B may not be aware of any TTZ internal nodes (e.g., TTZ internal node 122A in FIG. 1) located along the virtual link 240 between the TTZ edge node 120A and the TTZ edge node 120B. Alternatively, the virtualized TTZ 230 may be configured to appear as a single router that connects to the nodes 110A-110K outside of the virtualized TTZ 230.

Figure 3:
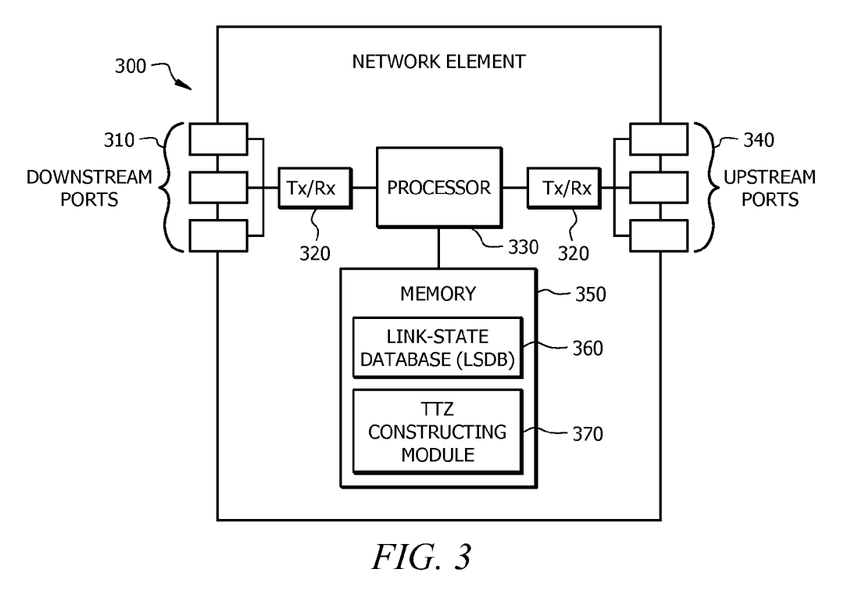
FIG. 3 is a schematic diagram of an example embodiment of a network element.

FIG. 3 is a schematic view of an embodiment of a network element 300 that may be used to transport and process data traffic through a network or a label switched system 100 shown in FIG. 1. At least some of the features/methods described in the disclosure may be implemented in a network element. For instance, the features/methods of the disclosure may be implemented in hardware, firmware, and/or software installed to run on the hardware. The network element may be any device (e.g., a switch, router, bridge, server, client, etc.) that transports data through a network, system, and/or domain. Moreover, the terms network "element," "node," "component," "module," and/or similar terms may be interchangeably used to generally describe a network device and do not have a particular or special meaning unless otherwise specifically stated and/or claimed within the disclosure. In one example embodiment, the network element 300 may be an apparatus used to generate and communicate an RI LSA and/or an LSA, to store an RI LSA and/or an LSA, to establish and/or virtualize a TTZ, to compute route costs, to process data traffic, and/or to communicate data traffic. For example, network element 300 may be a TTZ edge node 120A-120D and/or a TTZ internal node 122A-122F as described in FIG. 1.

The network device 300 may comprise one or more downstream ports 310 coupled to a transceiver (Tx/Rx) 320, which may be transmitters, receivers, or combinations thereof. The Tx/Rx 320 may transmit and/or receive frames from other network nodes via the downstream ports 310. Similarly, the network element 300 may comprise another Tx/Rx 320 coupled to a plurality of upstream ports 340, wherein the Tx/Rx 320 mat transmit and/or receive frames from other nodes via the upstream ports 340. The downstream ports 310 and/or the upstream ports 340 may include electrical and/or optical transmitting and/or receiving components.

A processor 330 may be coupled to the Tx/Rx 320 and may be configured to process the frames and/or determine which nodes to send (e.g., transmit) the frames. In an example embodiment, processor 330 may comprise one or more multi-core processors and/or memory modules 350, which may function as data stores, buffers, etc. The processor 330 may be implemented as a general processor or may be part of one or more application specific integrated circuits (ASICs), field-programmable gate arrays (FPGAs), and/or digital signal processors (DSPs). Although illustrated as a single processor, the processor 330 is not so limited and may comprise multiple processors. The processor 330 may be configured to implement any of the schemes described herein, including method 700 and method 800 as described in FIGS. 7 and 8, respectively.

FIG. 3 illustrates that a memory module 350 may be coupled to the processor 330 and may be a non-transitory medium configured to store various types of data. Memory module 350 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the system and methods described herein (e.g., as a network node). In an example embodiment, the memory module 350 may comprise one or more LSDBs 360 and/or a TTZ constructing module 370 that may be implemented on the processor 330. Alternatively, the TTZ constructing module 370 may be implemented directly on the processor 330. The LSDB 360 may be configured to store LSAs and/or RI LSAs. The TTZ constructing module 370 may be configured to generate and communicate a RI LSA and an LSA used to construct a TTZ. Generating and communicating a RI LSA and/or an LSA used to construct a TTZ will be discussed in more detail in FIG. 7.

It is understood that by programming and/or loading executable instructions onto the network element 300, at least one of the processor 330, the cache, and the long-term storage are changed, transforming the network element 300 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
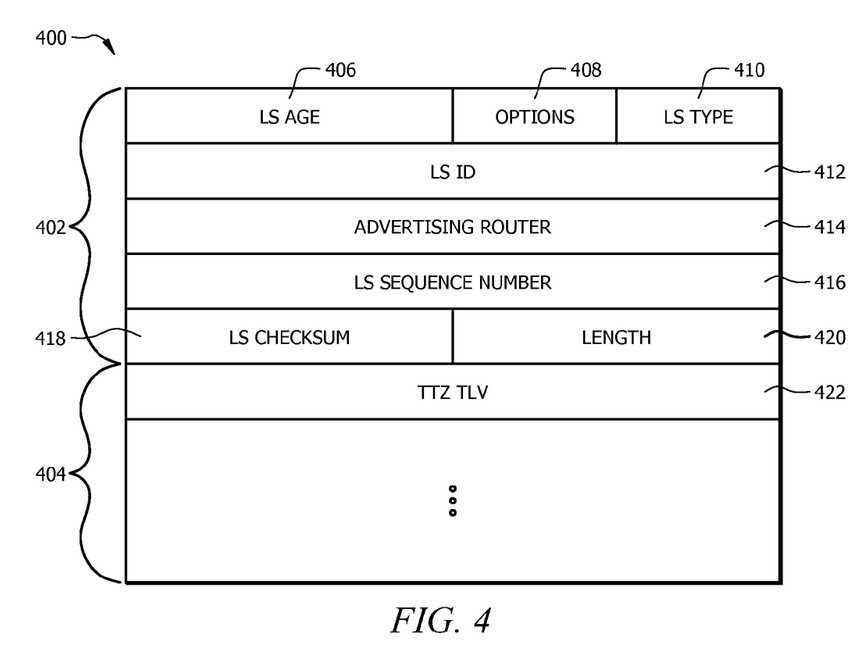
FIG. 4 is an example embodiment of a router information link-state advertisement frame.

FIG. 4 is an example embodiment of an RI LSA frame 400. In an example embodiment, the RI LSA frame 400 may be configured to describe and/or to communicate information about a network node within a TTZ. For example, an RI LSA 400 may describe a TTZ edge node (e.g., TTZ edge nodes 120A-120D as described in FIG. 1) or a TTZ internal node (e.g., TTZ internal nodes 122A-122F as described in FIG. 1) associated with the TTZ. RI LSA frame 400 comprises a header portion 402 and a TTZ TLV portion 404. The header portion 402 comprises a link-state (LS) age field 406, an options field 408, an LS type field 410, an LS ID field 412, an advertising router field 414, an LS sequence number field 416, an LS checksum field 418, and a length field 420. The LS age field 406 may be about 16 bits and may indicate a time (e.g., in seconds) since the LS originated. The option field 408 may be about eight bits and may indicate one or more optional capabilities supported by the corresponding portion of the routing domain. The LS type field 410 may be about eight bits and may indicate a type of LSA, for example, a link scoped Opaque-LSA, an area-scoped Opaque-LSA, or an AS-scoped LSA. The LS ID field 412 may be about 32 bits and may comprise an eight bit Opaque type and a 24 bit Opaque ID. In one example embodiment, the Opaque type may have a value of four and the Opaque ID may have a value of zero. The advertising router field 414 may be about 32 bits and may identify the network node advertising the LSA. The LS sequence number field 416 may be about 32 bits and may indicate an instance of an LSA. The LS checksum field 418 may be about 16 bits and may comprise a checksum (e.g., a Fletcher checksum) of the complete contents of the LSA. The length field 420 may be about 16 bits and may indicate the length (e.g., in bytes) of the LSA. The TTZ TLV portion 404 comprises one or more TTZ TLVs 422. The TTZ TLV 422 may describe a TTZ node configuration, as will be discussed in FIG. 5.

Alternatively, an RI LSA frame may be a conventional Router LSA frame configured such that the existing type field for a router link may be split into two fields. For example, the type field may comprise a flag field and a new type field. The flag field may be about one bit and may indicate that the router link is an internal TTZ link or an external TTZ link. For example, the flag field may have a first value (e.g., a value of one) to indicate the router link in an internal TTZ link and a second value (e.g., a value of zero) to indicate the router link is an external TTZ link. The new type field may be about seven bits and may indicate the kind of link. For example, the new type field may indicate the link is a point-to-point connection to another router, a connection to a transit network, a connection to a stub network, or a virtual link.

Figure 5:
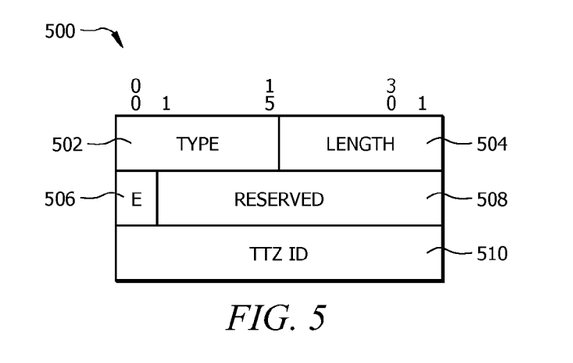
FIG. 5 is an example embodiment of a topology-transparent zone type-length-value frame.

FIG. 5 is an example embodiment of a TTZ TLV frame 500. In one example embodiment, the TTZ TLV frame 500 may be configured to describe a TTZ node configuration. The TTZ TLV frame 500 comprises a type field 502, a length field 504, an e-bit field 506, a reserved field 508, and a TTZ ID field 510. The type field 502 may be about 16 bits and may indicate the type of TLV. For example, the type field 502 may be set to two, which may indicate the TLV is a TTZ TLV. Additionally, the type field 502 may be set to a value determined by the Internet Assigned Numbers Authority (IANA). The length field 504 may be about 16 bits and may indicate the length (e.g., in bytes) of the TTZ TLV 500. The e-bit field 506 may be one bit and may indicate the type (e.g., a TTZ edge node or a TTZ internal node) of TTZ node. For example, the e-bit field 506 may be set to a first value (e.g., set to zero) to indicate a TTZ internal node or may be set to a second value (e.g., set to one) to indicate a TTZ edge node. The reserved field 508 may be about 31 bits and may be reserved for later use. The TTZ ID field 510 may be 32 bits and may identify a TTZ (e.g., a group of TTZ nodes).

Figure 6:
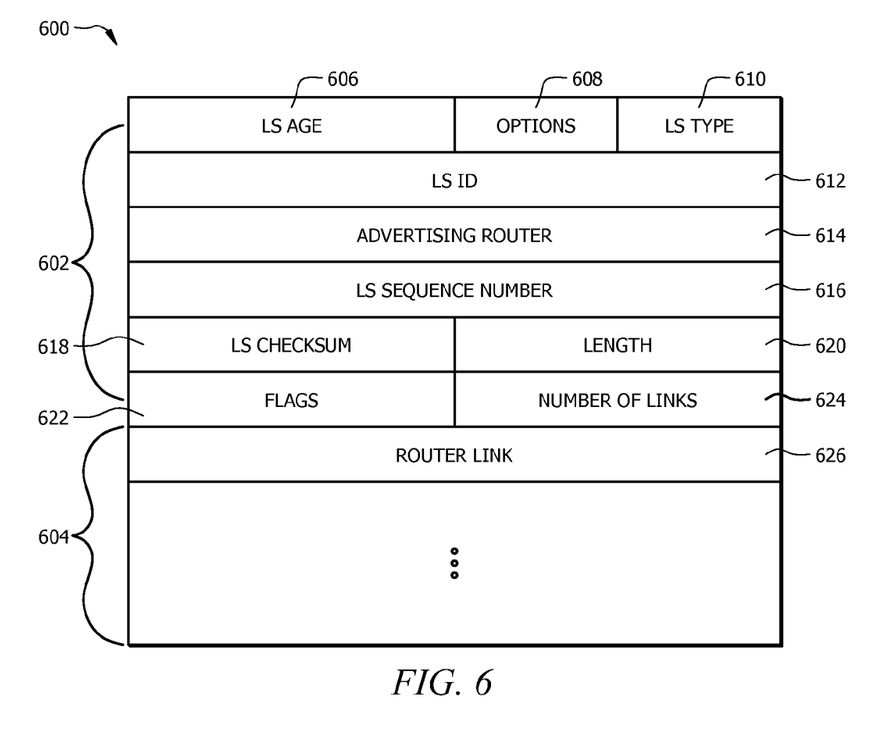
FIG. 6 is an example embodiment of a link-state advertisement for virtualization frame.

FIG. 6 is an example embodiment of an LSA for virtualization frame 600. In an example embodiment, the LSA for virtualization frame 600 may be configured to describe and/or to communicate information about a TTZ. For example, the LSA for virtualizing frame 600 may be used to generate or virtualize the TTZ upon distributing the RI LSAs and/or computing one or more paths (e.g., virtual paths 240 as described in FIG. 2). The LSA for virtualization frame 600 comprises a header portion 602 and a router link portion 604. The header portion 602 comprises an LS age field 606, an options field 608, an LS type field 610, an LS ID field 612, an advertising router field 614, an LS sequence number field 616, an LS checksum field 618, a length field 620, a flags field 622, and a number of links field 624. The LS age field 606, the options field 608, the advertising router field 614, the LS sequence number field 616, the LS checksum field 618, and the length field 620 may be substantially similar to fields with like-names as described in FIG. 4. The LSA type field 610 may be about eight bits and may indicate a type of LSA, for example, a router LSA. The LS ID field 612 may be about 32 bits and may have the same value as the advertising router field 614. The flags field 622 may be about 16-bits and may indicate the characteristics of a network node that originates the LSA for virtualization frame 600. The number of links field 624 may be about 16-bits and may indicate the number of router links that are described in the router link portion 604. The router link portion 604 may be about 96 bits and may comprise one or more router links 626. For example, the router link portion 604 may comprise non-TTZ links and/or virtual links. The router link 626 may describe links associated with a network node in the TTZ.

Figure 7:
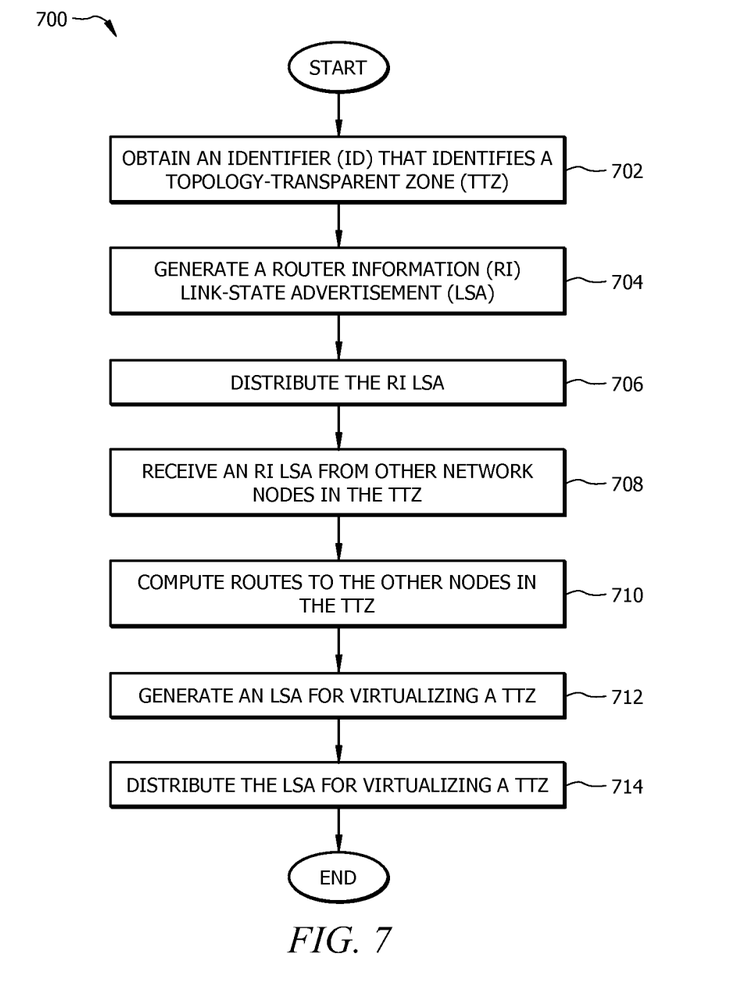
FIG. 7 is a flowchart of an example embodiment of a topology-transparent zone constructing method.

FIG. 7 is a flowchart of an example embodiment of a TTZ constructing method 700. In an example embodiment, a TTZ edge node (e.g., TTZ edge node 120A-120D) may be configured to employ method 700 to operate within a TTZ. At step 702, method 700 may obtain an ID that identifies the TTZ. For example, a TTZ edge node may be configured with a TTZ ID and one or more TTZ links by a network operator. The TTZ ID may be a common ID unique to the TTZ and may be assigned to all network nodes located within the TTZ. At step 704, method 700 may generate an RI LSA Method 700 may generate an RI LSA, such as the RI LSA frame 400 as described in FIG. 4. The RI LSA may comprise a TTZ TLV, such as the TTZ TLV frame 500 as described in FIG. 5. Method 700 may generate a TTZ TLV such that the e-bit field has a value of one indicating the network node is a TTZ edge node. Additionally, method 700 may generate the TTZ TLV such that the TTZ ID field is set to the TTZ ID associated with the TTZ.

At step 706, method 700 may distribute the RI LSA. For example, method 700 may send the RI LSA to other network nodes using the TTZ links of the TTZ edge node. Method 700 may not send the RI LSA to other network nodes outside of the TTZ. At step 708, method 700 may receive an RI LSA from other network nodes in the TTZ. For example, method 700 may receive an RI LSA from TTZ edge nodes and/or TTZ internal nodes in the TTZ. At step 708, method 700 may also store the RI LSA information for the TTZ edge nodes and/or the TTZ internal nodes in the TTZ (e.g., in a LSDB) and may send the RI LSA information to other network nodes using the TTZ links of the TTZ edge node. At step 710, method 700 may compute routes to other network nodes in the TTZ. For example, method 700 may compute paths or virtual links to other network nodes using an LSDB. Method 700 may use the RI LSAs with the same TTZ ID and the LSDB to compute the shortest path to network nodes configured as a TTZ edge node. Alternatively, method 700 may compute paths between network nodes within the TTZ (e.g., between TTZ edge nodes) using any other method as would be appreciated by one of ordinary skill in the art upon viewing this disclosure.

At step 712, method 700 may generate an LSA for virtualizing a TTZ. The LSA for virtualizing the TTZ may be substantially similar to the LSA for virtualization frame 600 as described in FIG. 6. The router link portion of the LSA for virtualizing the TTZ may be populated with non-TTZ links and/or virtual links associated with the network node. For example, the router link portion of the LSA for virtualizing the TTZ may be populated with links having the lowest cost or shortest path. Additionally, the LSA for virtualizing the TTZ may be updated when other network nodes configured as TTZ edge nodes are added or removed from the TTZ and/or when the cost to another TTZ edge node changes.

At step 714, method 700 may distribute the LSA for virtualizing the TTZ. For example, method 700 may send the LSA by flooding the LSA to other network nodes using the TTZ links and non-TTZ links of the TTZ edge node. Alternatively, method 700 may receive an LSA for virtualizing the TTZ from other network node in the TTZ. Method 700 may store the LSA for virtualizing the TTZ information for the other network nodes in the TTZ edge node (e.g., in a LSDB) and may send the LSA for virtualizing the TTZ information for the other network nodes in the TTZ to other network nodes using the TTZ links of the TTZ edge node. In an example embodiment, method 700 may store the LSA for virtualizing the TTZ information for the other network nodes in the TTZ in a first LSDB that is distinct from a second LSDB used to store the RI LSA information for the other network nodes in the TTZ. The TTZ may be virtualized following the distribution of the LSAs for virtualizing the TTZ.

Figure 8:
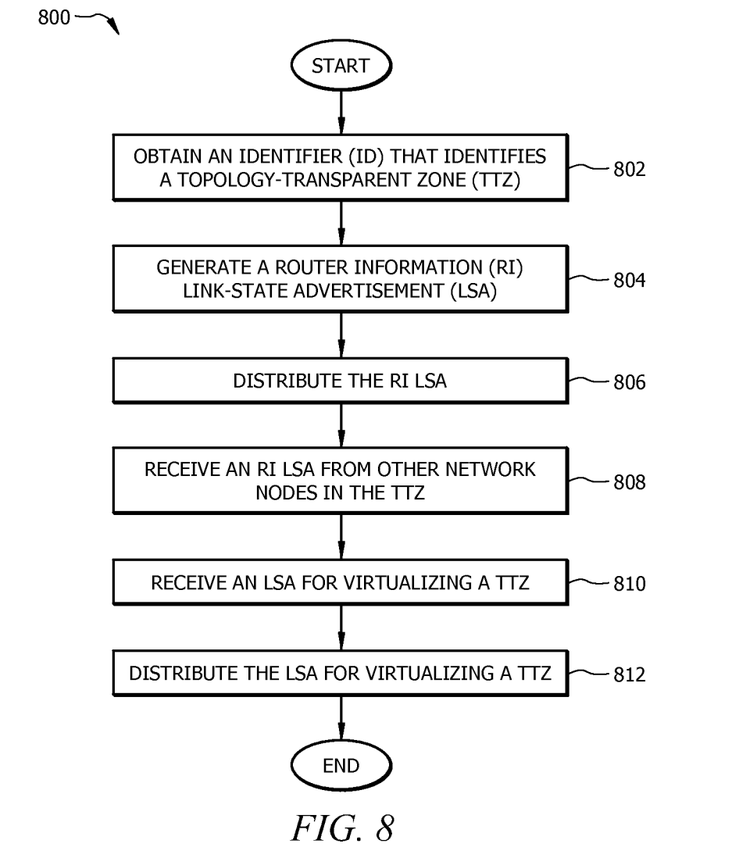
FIG. 8 is a flowchart of another example embodiment of a topology-transparent zone constructing method.

FIG. 8 is a flowchart of another example embodiment of a TTZ constructing method 800. In an example embodiment, a TTZ internal node (e.g., TTZ internal node 122A-122F) may be configured to employ method 800 to operate within a TTZ. At step 802, method 800 may obtain an ID that identifies the TTZ. Method 800 may also obtain a TTZ ID and one or more TTZ links assigned by a network operator. The TTZ ID may be a common ID unique to the TTZ. At step 804, method 800 may generate an RI LSA. For example, method 800 may generate an RI LSA, such as, RI LSA frame 400 as described in FIG. 4. The RI LSA may comprise a TTZ TLV, such as, TTZ TLV frame 500 as described in FIG. 5. Method 800 may generate a TTZ TLV such that the e-bit field has a value of zero indicating the network node is a TTZ internal node. Additionally, method 800 may generate the TTZ TLV such that the TTZ ID field is set to the TTZ ID associated with the TTZ.

At step 806, method 800 may distribute the RI LSA. For example, method 800 may send the RI LSA to other network nodes using the TTZ links of the TTZ internal node. Method 800 may not send the RI LSA to other network nodes outside of the TTZ. At step 808, method 800 may receive an RI LSA from other network nodes in the TTZ. Method 800 may receive an RI LSA from TTZ edge nodes and/or TTZ internal nodes in the TTZ. At step 808, method 800 may also store the RI LSA information for the TTZ edge nodes and/or the TTZ internal nodes in the TTZ internal node (e.g., in a LSDB) and may send the RI LSA information to other network nodes using the TTZ links of the TTZ internal node.

At step 810, method 800 may receive an LSA for virtualizing a TTZ. The LSA for virtualizing the TTZ may be substantially similar to the LSA for virtualization frame 600 as described in FIG. 6. At step 812, method 800 may distribute the LSA for virtualizing the TTZ. Method 800 may send the LSA for virtualizing the TTZ to other network nodes using the TTZ links and non-TTZ links of the TTZ internal node. The TTZ may be virtualized following the distribution of the LSAs for virtualizing the TTZ.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. In a network component, a method for constructing a topology-transparent zone (TTZ), the method comprising:
   obtaining a TTZ identifier (ID) uniquely associated with the TTZ;
   identifying a first link connected to a second network node that is assigned the TTZ ID;
   identifying a second link connected to a third network node not assigned the TTZ ID;
   generating a router information (RI) link-state advertisement (LSA) comprising a first field that indicates a network node type and a second field that indicates the TTZ ID;
   distributing the RI LSA using the first link;
   generating an LSA for virtualizing the TTZ for the network component comprising the second link and one or more virtual links;
   sending the LSA for virtualizing the TTZ using the second link;
   receiving a second RI LSA that comprises the TTZ ID
   storing at least a portion of information within the second RI LSA into a link-state database (LSDB); and
   computing a path using the second RI LSA and the LSDB,
   wherein each virtual link of the one or more virtual links is a logical link between two edge nodes via at least one additional node of the TTZ, and
   wherein the TTZ is a zone within an area that is part of a network.

2. The method of claim 1, further comprising sending the second RI LSA using the first link.

3. The method of claim 1, wherein the first link is not advertised to a network node outside of the TTZ.

4. The method of claim 1, further comprising receiving the LSA for virtualizing the TTZ comprising the one or more virtual links.

5. The method of claim 4, further comprising storing the LSA for virtualizing the TTZ into a link-state database (LSDB).

6. The method of claim 4, further comprising sending the LSA for virtualizing the TTZ using the second link.

7. A computer program product comprising computer executable instructions stored on a non-transitory computer readable medium such that when executed by a processor causes a network node to:
   obtain a topology-transparent zone (TTZ) identifier (ID) uniquely associated with a TTZ;
   determine a plurality of links used to forward data to a plurality of adjacent nodes;
   generate a router information (RI) link-state advertisement (LSA);
   flood the RI LSA to the adjacent nodes using the plurality of links;
   generate an LSA for virtualizing the TTZ for the network node comprising a plurality of virtual links;
   flood the LSA for virtualizing the TTZ using the plurality of link;
   receive a plurality of second RI LSAs comprising the TTZ ID; and
   compute paths using the plurality of second RI LSAs,
   wherein the plurality of second RI LSAs are stored in a LSDB,
   wherein each virtual link of the plurality of virtual links is a logical link between two edge nodes via at least one additional node of the TTZ,
   wherein the RI LSA comprises the TTZ ID, and
   wherein one or more network nodes of the adjacent nodes are configured with the TTZ ID.

8. The computer program product of claim 7, wherein the computer executable instructions when executed by the processor cause the network node to receive an LSA for virtualizing the TTZ comprising a second plurality of virtual links.

9. An apparatus comprising:
   a receiver;
   a memory; and
   a processor coupled to the memory and the receiver, wherein the memory comprises computer executable instructions stored in a non-transitory computer readable medium such that when executed by the processor causes the processor to:
      obtain a topology-transparent zone (TTZ) identifier (ID) uniquely associated with the TTZ;
      identify a plurality of links that comprises a plurality of virtual links and a link to a network node not assigned the TTZ ID;
      generate a link-state advertisement (LSA) for virtualizing the TTZ that comprises the plurality of virtual links and the link;
      store a second LSA for virtualizing the TTZ into a link-state database (LSDB); and
      compute a path using the second LSA and the LSDB; and
   a transmitter coupled to the processor, wherein the transmitter is configured to distribute the LSA for virtualizing the TTZ using the link,
   wherein the receiver is configured to receive the second LSA for virtualizing the TTZ that comprises a second virtual link,
   wherein each virtual link of the plurality of virtual links is a logical link between two edge nodes via at least one additional node of the TTZ, and
   wherein the TTZ is a virtualized zone within a network.

10. The apparatus of claim 9, wherein the transmitter is further configured to send the second LSA for virtualizing the TTZ using the link.

11. The apparatus of claim 9, wherein the plurality of virtual links comprises a plurality of paths along two or more TTZ links of a plurality of TTZ links.

* * * * *